June 18, 1963  R. F. DE SIMONE  3,093,915
MECHANICAL GRADING DEVICE
Filed Aug. 7, 1961
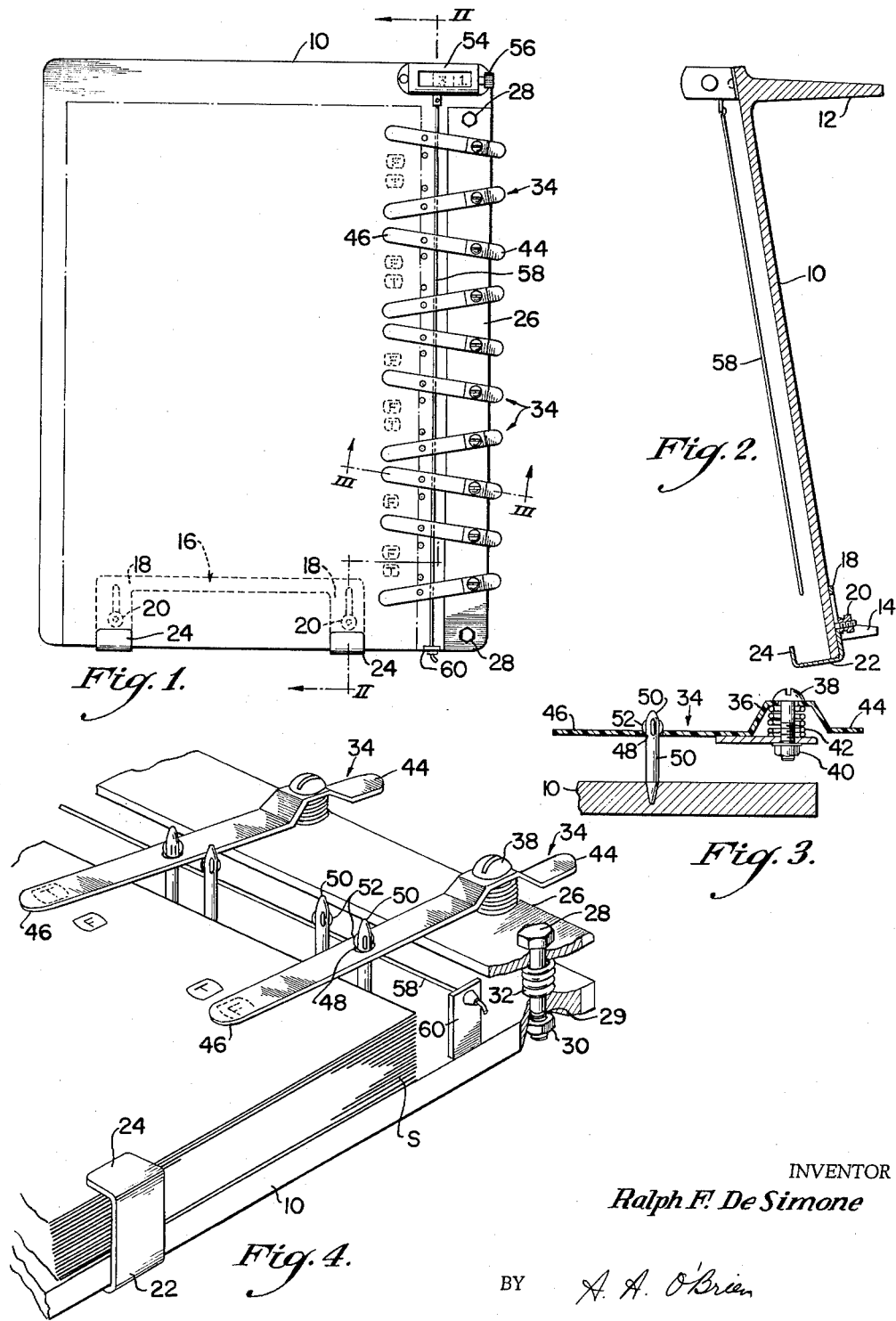
INVENTOR
*Ralph F. De Simone*
BY
ATTORNEY united States Patent Office 3,093,915
Patented June 18, 1963

3,093,915
MECHANICAL GRADING DEVICE
Ralph F. De Simone, 13420 Keating St., Rockville, Md.
Filed Aug. 7, 1961, Ser. No. 129,703
9 Claims. (Cl. 35—48)

This invention relates to mechanical aids to education and in particular to mechanical grading devices for examination papers.

In our modern schools, particularly at the elementary grade school level, a continually increasing problem is presented in that too much of the teacher's time is devoted to non-teaching activities. The grading of examination papers is so time consuming that the teacher must perform this duty during non-school hours with the result that there is an unreasonable time lapse between the taking of the examination and the returning of the graded papers to the students. Because of such time lapse, both the teacher and the students have lost interest by the time the graded papers have been returned to the students. Furthermore, the classroom activities may have progressed to a new and more complicated subject matter whereas the results of the examination indicate that the majority of the students were not sufficiently familiar with the previous subject matter. In this event, the teacher must undergo a review of the previous subject matter, which review is more time consuming than it would have been if undertaken within a reasonable time after the examination test was completed.

With the use of the present invention, it is possible for the teacher to grade a complete set of examination papers immediately after the test is completed. Thus, the teacher is able to immediately determine the students' knowledge of the examined subject matter before proceeding with instructions on new matter. The grading of test papers has been so facilitated by this invention that a teacher is not limited to a particular number of examinations during a school term but rather may conduct any number of examinations as required to indicate the progress of the class.

It is, therefore, an object of this invention to facilitate the grading of examination papers.

Another object of this invention is to increase the speed of grading examination papers.

This invention has another object in that a mechanical examination grader is relatively simple to operate and is of compact, economical structure.

This invention has another object in that the answer indicating means on a mechanical grader are individually moved to a selected answer indicating position.

A further object of this invention is to mount a plurality of answer indicating means on a movable bar member for unitary movement therewith.

In the preferred embodiment of this invention, a supporting surface holds a stack of examination papers which have a series of true-false type of answers to be graded. A plurality of indicating elements movably mounted on a bar member are retained in selected position corresponding to the incorrect answers on the papers. With the indicating elements overlying the incorrect answers, the grader may simply mark the student's wrong answers with a single stroke of a pencil.

Additional features and advantages of the invention will be apparent from the following description taken in connection with the accompanying drawing wherein:

FIG. 1 is a top plan view of the preferred embodiment of the invention;

FIG. 2 is a cross section taken along the line II—II of FIG. 1;

FIG. 3 is a partial section on an enlarged scale taken along line III—III of FIG. 1; and FIG. 4 is a partial isometric view on an enlarged scale of the lower portion of FIG. 1.

In the drawing, there is disclosed in FIG. 1 a substantially flat grader board 10 having a generally rectangular configuration and being made of any suitable material having a hard surface such as metal, wood, or plastic. The undersurface of board 10 is provided with upper and lower leg members, 12 and 14, respectively; leg 12 is larger than leg 14 whereby the board 10 will normally rest at a slight incline relative to a horizontal support surface, such as a desk top (not shown). Adjacent its lower edge, the board 10 carries an adjustable sheet holder, indicated generally at 16, which includes a pair of slotted end brackets 18 secured to the undersurface of the board 10 by any suitable fastening means, such as screws 20. Each of the brackets 18 has a perpendicular portion 22 (FIG. 4) extending outwardly from the board 10; the extremity of each portion 22 forms a reversely bent tab 24. The portion 22 and tabs 24 are adapted to hold and retain a stack of examination sheets S on the board 10.

A generally rectangular elongated bar 26 is attached to the base 10 adjacent the righthand edge thereof as viewed in FIG. 1 by means of a plurality of headed bolts 28 (only two being shown). Each bolt 28 extends through a smooth opening in the bar 26 and is threadedly disposed through a threaded opening 29 in the base 10 and carries a lock nut 30 abutting the undersurface of the base 10. A coil spring 32 encircles the intermediate shank of the bolt 28 and is mounted in compression between the upper surface of the base 10 and the undersurface of the bar 26. With such an arrangement, the bar 26 is resiliently carried by the base 10 and may be depressed against the bias of coil spring 32. In addition, the spacing between the bar 26 and the base 10, together with the biasing force of coil spring 32, may be selectively adjusted by rotating the bolt 28 in the threaded opening 29 in the base 10. Thus, the bar 26 may be adjusted vertically to accommodate various thicknesses of stacks formed by the examination test sheets S.

A plurality of answer indicating elements in the form of true-false indicators 34 are mounted in spaced relation along the upper surface of the bar 26. The number of the indicators may be varied to suit the particular number of true-false questions which are commonly presented on the examination test sheets. For instance, a ninth grade teacher may require a base 10 and bar 26 to accommodate a series of twenty questions while a first grade teacher would only use ten questions requiring a base 10 and a bar 26 with only ten true-false indicators 34 as is illustrated in FIG. 1.

The true-false indicators 34 have generally rectangular configurations and inasmuch as they are identical, only one indicator will be described in detail. As is illustrated in FIG. 3, the answer indicator 34 has a substantially inverted U-shaped portion 36, the central part of which is provided with an aperture. A bolt 38 extends through the aperture in portion 36 and through an aligned aperture in bar 26 for receiving a lock nut 40. A coil spring 42 surrounds the shank of bolt 38 and is mounted in compression between the undersurface of the portion 36 and the upper surface of the bar 26. The right end of indicator 34 as viewed in FIG. 1 is provided with a finger tab 44 and the left end with an indicating extension 46 that overlies the true or false block imprinted on the examination test sheet. Intermediate the tab 44 and extension 46, the indicator 34 has an aperture 48 for receiving retaining means in the form of a post 50 which is securely fixed to the base 10. Thus, the indicator 34 is retained in a selected position on a true or false post 50. Each indicator 34 is provided with a set of two posts 50, slightly spaced from each other to conform to similar spacing between the true and false blocks on the examination sheets S. Each post 50 is provided with a plurality of resilient projections 52, suitably formed so as to be flexible as by being made of rubber; by means of the aperture 48, the indicator 34 slides over the resilient projections 52 whereby the indicator 34 is positioned and retained on a selective true or false post 50.

The true-false indicators 34 are made of any suitable material, such as plastic, so as to be transparent. Thus, when the indicator extension is positioned over one of the true or false blocks on the examination sheet, the block itself will be visible.

A counter or register device 54 is secured to the base 10 adjacent the top edge by any suitable fastening means. A manually operable knob 56 protrudes exteriorly of the counter for returning the same to a zero position. The counter 54 is actuated by an operating wire 58, one end of which is attached to a spring return lever on the counter 54 and the other end being attached to a bracket 60 fixed to the base 10. As is apparent from FIG. 1, the wire 58 extends longitudinally adjacent the bar 26 and is disposed between the bar 26 and the series of spaced true and false posts 50.

In operating the device, the teacher places a stack S of examination papers on the support 10, which papers have been marked by the students in the appropriate true or false blocks for the ten questions. The holder 16 may then be adjusted to align the true-false blocks on the examination papers with the corresponding true-false posts 50 on the support 10. The indicators 34 are then set by the teacher so that the extension 46 will overlie the incorrect answers on the true or false blocks of the examination papers. With such an arrangement, the correct answers are visible at a glance and any correct answer that is wrongly marked on the examination paper is readily visible. Inasmuch as the indicator 34 is made of transparent material, each true-false block can be viewed by the teacher. The teacher merely slashes the wrong answers with a pencil, hitting the operating wire 58 and causing the counter 54 to register the total number of wrong answers.

Inasmuch as the counter 54 will give an immediate reading of a factor for determining the class average of a given examination, the teacher is supplied with immediate knowledge as to the advisability of reexamination.

When it is desired to insert a stack S of examination papers on the support 10, all of the indicators 34 may be raised as a unit to facilitate the insertion of the papers thereunder. This action is accomplished by depressing the right hand edge of the bar member 26 as viewed in FIG. 1; because of the enlarged apertures surrounding the bolts 28, the coil springs 32 will be depressed on one side of such apertures and expanded on the other whereby the lefthand edge of the bar member 26 will be pivoted or tilted slightly in an upward direction. In turn, the extensions 46 of the indicators 34 will likewise be tilted upward whereupon a stack of examination papers may be inserted.

As it will be understood that this invention is susceptible to modification in order to adapt it to different conditions without departing from the scope hereof, it is intended that all matter contained in the above description or shown on the accompanying drawing shall be interpreted as illustrative and not in a limiting sense.

I claim:

1. An examination grading device comprising a support adapted to hold a plurality of examination papers which are to be graded, retaining means including a plurality of posts fixed to said support in spaced relation, a bar member resiliently carried by said support adjacent one edge thereof, indicating means mounted on said bar member including a plurality of indicating elements, one for each two of said posts, said indicating elements each being retained on a selected one of its two corresponding posts and each having a portion adapted to overlie the examination papers.

2. The combination as recited in claim 1 wherein each of said indicating elements is pivotally mounted on said bar member for selectively positioning on one of the two corresponding posts.

3. An examination grading device comprising a support adapted to receive a stack of examination papers which are to be graded, paper holding means adjustably mounted on said support to accommodate various sizes of examination papers and adapted to engage one edge of the stack of examination papers, a plurality of sets of upstanding posts fixed to said support in spaced relation so as to engage another edge of the stack of examination papers, a bar member disposed adjacent said sets of upstanding posts, a plurality of answer indicating elements, one for each set of upstanding posts, disposed in spaced relation on said bar member so as to be in operative relation with the corresponding sets of upstanding posts, a pivotal mounting for each of said answering indicating elements for selectively positioning the same in operative engagement with one of its corresponding upstanding posts, adjustable resilient means for biasingly mounting said bar member on said support whereby the entire plurality of answer indicating elements may be movable as a unit and may be adjustable as a unit, and means fixed to said support for counting a number of answers graded on the examination papers.

4. The combination as recited in claim 3 wherein said last mentioned means comprises a counter and an operating wire therefor extending longitudinally between said bar member and said plurality of sets of upstanding posts.

5. The combination as recited in claim 3 wherein said answering indicating elements are made of transparent material and have extension portions adapted to overlie the one edge of the stack of examination papers.

6. An examination grading device comprising a support, a stack of examination papers on said support and having a plurality of true-false answers to be graded, paper holding means on one edge of said support engaging one edge of said stack of papers, adjustable mounting means for said holding means to accommodate different sizes of examination papers, a plurality of sets of upstanding posts fixed to said support in spaced relation, each of said sets including two posts corresponding to a pair of true-false answers on said examination papers, a bar member disposed along another edge of said support in spaced parallel relation to said sets of upstanding posts, a plurality of true-false pointers on said bar member, one pointer for each set of upstanding posts, mounting means for each pointer being movable for selectively positioning each pointer on one of its corresponding two posts, each of said pointers having an extension adapted to cooperate with one of its corresponding pairs of true-false answers on said examination papers, and movable mounting means for attaching said bar member to said support whereby actuation of said bar member causes movement of said plurality of pointers.

7. The combination as recited in claim 6 wherein each of said upstanding posts is provided with retaining elements to retain its corresponding pointer on its selected upstanding post.

8. The combination as recited in claim 6 wherein said movable mounting means comprises bolt means extending through said bar member and said support and resilient means mounted in compression between said bar member and said support whereby said bar member is disposed in spaced parallel relation to said support.

9. An examination paper grading device comprising a support adapted to hold a plurality of examination papers which have a plurality of sets of examination answers to be graded, a plurality of sets of retaining members including one retaining member for each of the answers, a bar member carried by said support, a plurality of answer indicating elements including one element for each set of retaining members, each of said elements having a mounting portion for mounting on said bar member and a transparent portion adapted to overlie a selected one of the answers of a corresponding set of answers, said mounting portion of each element being movably connected to said bar member and permitting movement of each element into operative engagement with a selected one of its corresponding set of retaining members whereby only one of the answers in each set is covered by said transparent portion.

References Cited in the file of this patent

UNITED STATES PATENTS

| | | |
|---|---|---|
| 2,052,442 | Black | Aug. 25, 1936 |
| 2,586,234 | Kopas | Feb. 19, 1952 |
| 2,841,890 | Bailey | July 8, 1958 |